United States Patent [19]

Tamura et al.

[11] 4,173,318
[45] Nov. 6, 1979

[54] WEBBING RETRACTOR IN SAFETY SEATBELT SYSTEM

[75] Inventors: Keiichi Tamura, Nagoya; Masahiro Iwatsuki, Toyoake; Muneharu Matsunami, Seto, all of Japan

[73] Assignee: Kabushiki Kaisha Tokai Rika Denki Seisakusho, Aichi, Japan

[21] Appl. No.: 913,021

[22] Filed: Jun. 6, 1978

[30] Foreign Application Priority Data

Jun. 8, 1977 [JP] Japan ................. 52/74364[U]

[51] Int. Cl.² .................. A62B 35/02; B65H 75/48
[52] U.S. Cl. .................. 242/107.4 A; 242/107.6
[58] Field of Search ......... 242/107.4 R, 107.4 E, 242/107.6, 107.7, 107.12; 297/388; 280/744–747

[56] References Cited

U.S. PATENT DOCUMENTS 3,240,510  3/1966  Spouge ............ 242/107.4 A
4,077,584  3/1978  Lafont ............ 242/107.4 A

*Primary Examiner*—Harvey C. Hornsby
*Assistant Examiner*—John M. Jillions
*Attorney, Agent, or Firm*—Koda and Androlia

[57] ABSTRACT

A webbing retractor in a safety seatbelt system, wherein the webbing is wound up by a take-up shaft through a biasing force and wherein the retractor is provided with a sensor for sensing the vibrations of the vehicle and a locking device actuated by the sensor to prevent the windup force of the take-up shaft from being applied to the webbing whereby pleasant fitness is obtained when the vehicle runs on a bad road.

4 Claims, 3 Drawing Figures

WEBBING RETRACTOR IN SAFETY SEATBELT SYSTEM

BACKGROUND OF THE INVENTION

1. Field of the Invention

The present invention relates to a webbing retractor for winding up a webbing for restraining an occupant in an emergency in a vehicle, and more particularly to a webbing retractor for obtaining improved fitness.

2. Description of the Prior Art

For the webbing retractors for restraining the occupant in an emergency in a vehicle to secure safety for the occupant, such an arrangement is commonly used that the remaining portion of the webbing for restraining the occupant is wound up in the retractor by a biasing force.

Additionally, in the retractor, there has been provided an inertia-lock mechanism which senses the emergency of the vehicle and instantly stops winding out of the webbing, whereby it is possible for the occupant to wind out the webbing from the retractor against the biasing force in a normal running condition of the vehicle, thereby enabling the occupant to move freely.

However, with the conventional retractor as described above, there has been pointed out a disadvantage that, when the vehicle runs on a bad road and the like, the retractor gradually winds up the webbing to take up any slight slack between the occupant and the webbing, which is necessary for maintaining pleasant running condition, whereby a tension, i.e., an oppressive sensation given the occupant by the webbing, is gradually increased.

This condition is because the vehicle is vibrating, the vibrations actuate the intertia-lock mechanism, and hence, it is impossible to wind out the webbing from the retractor, and, every time the occupant moves, the retractor advances a ratchet included in the inertia-lock mechanism pitch by pitch by the biasing force of a spiral spring, whereby the occupant is gradually oppressed as if caught in an automatically tightening snare. Namely, at the time when the vehicle vibrates, the inertia-lock mechanism functions as an automatic retractor capable of merely winding up the webbing.

SUMMARY OF THE INVENTION

In view of the above facts, one object of the present invention is to provide a webbing retractor capable of attaining pleasant fitness at the time when the vehicle is vibrated. The present invention achieves the object by sensing the vibrations of the vehicle by a sensor which actuates a locking device to thereby prevent the winding up force of the take-up shaft from being applied to the webbing.

BRIEF DESCRIPTION OF THE DRAWINGS

Description will hereunder be given of one embodiment of the present invention with reference to the drawings.

DESCRIPTION OF THE PREFERRED EMBODIMENTS

Figure 1:
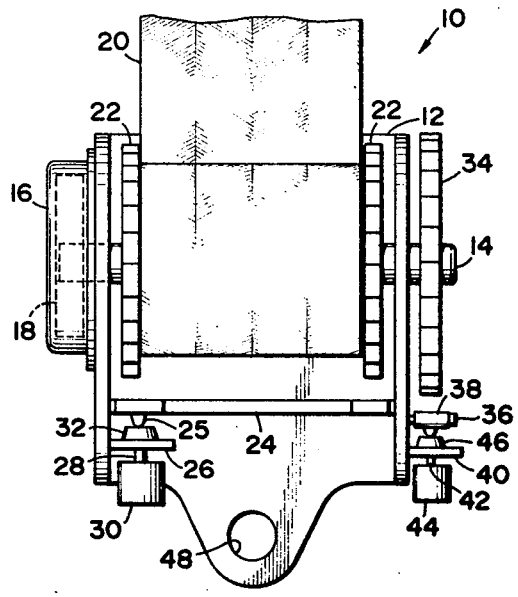
FIG. 1 is a front view showing one embodiment of the webbing retractor according to the present invention.
Figure 2:
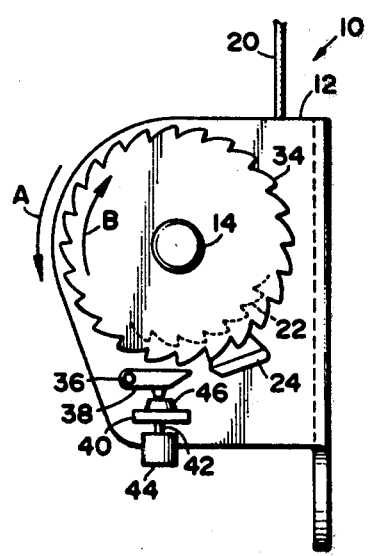
FIG. 2 is a side view thereof.
Figure 3:
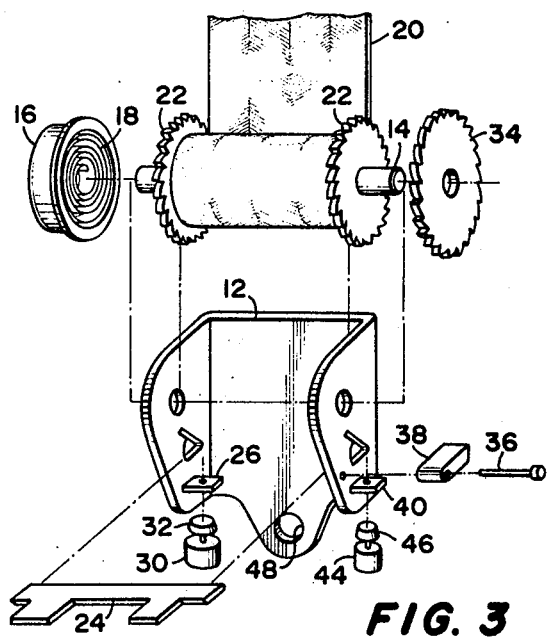
FIG. 3 is a disassembled oblique view thereof.

In FIGS. 1 through 3, a take-up shaft 14 is pivoted on a frame 12 of a webbing retractor 10. Engaged with one end of the take-up shaft 14 projecting from the frame 12 is a spiral spring 18 housed in a spring casing 16, which is adapted to windup a webbing 20 coupled to the take-up shaft 14 in the direction indicated by an arrow B.

Consequently, the occupant of the vehicle winds out the webbing 20 from the take-up shaft 14 against the biasing force of the spiral spring 18 in the direction indicated by an arrow A, and the other end of the webbing 20, which is not shown, becomes engagable with a buckle, not shown, so that the occupant can put the webbing on.

A pair of ratchet wheels 22 are solidly secured to the take-up shaft 14. A webbing 20 to be wound up in layers is interposed therebetween and adapted to rotate with the take-up shaft 14. A pawl 24 pivoted on the frame 12 meshes with the ratchet wheel 22, to thereby stop the wind-out rotation of the take-up shaft 14 in the direction indicated by the arrow A in FIG. 2. Additionally, the pawl 24 is provided at the lower portion thereof with a projection 25 which is mounted on the top 32 of a pendulum 30 whose neck 28 is supported on a bracket 26 projecting from the frame 12. Consequently, when the pendulum 30 functioning as the inertia sensor senses deceleration of the vehicle and oscillates, the top 32 urges the projection up to tilt pawl 24, to thereby mesh the pawl 24 with the ratchet wheel 22.

The other end portion of the take-up shaft opposite to the end portion, to which the spiral spring 18 is installed, projects from the frame 12 and has fixed thereon a ratchet wheel 34. Engagable with this ratchet wheel 34 is a pawl 38 pivoted on the outer surface of the frame 12 through a pin 36. This pawl 38 is mounted on the top 46 of a pendulum 44, similar to the aforesaid pendulum 30, whose neck 42 is supported by a bracket 40 projecting outwardly from the frame 12. When tilted similarly to the aforesaid pendulum 30, the pendulum 44 rotates the pawl 38 about the pin 36 to be engaged with the ratchet wheel 34, to thereby prevent the rotation of the take-up shaft 14 as well as the ratchet wheel 34. This ratchet wheel 34 has the direction of the ratchet teeth opposite to that of the ratchet wheel 22, to thereby prevent the take-up shaft 14 from rotating in the direction of winding up the webbing as indicated by the arrow B in FIG. 2.

Additionally, unlike the pendulum 30, the pendulum 44 senses the vibrations of the vehicle rather than the deceleration of the vehicle to actuate the pawl 38. Therefore, it is necessary to select the shape, size and mass of the pendulum 44 to meet the purpose.

In addition, the frame 12 is penetratingly provided therein with a hole 48 for installing the retractor 10 to the vehicle, so that the retractor 10 can be solidly secured to a suitable position of the vehicle.

The occupant easily puts on the webbing 20 wound out of the retractor arranged as above; and in an emergency of the vehicle, the pendulum 30 causes the pawl 24 to mesh with the ratchet wheel 22, whereby the webbing 20 is sharply stopped in the wind-out rotation in the direction indicated by the arrow A, so that the occupant is prevented by the webbing 20 from being moved to a large extent, thereby securing safety of the occupant.

Next, when the vehicle vibrates during running on a bad road and the like, the pendulum 44 senses the vibrations and causes the pawl 38 to engage with the ratchet wheel 34, whereby the take-up shaft 14 is stopped from the windup rotation in the direction indicated by the arrow B, so that the suitable slack between the occupant and the webbing is maintained. When the vehicle returns to running on a normal flat road again, the pawl 38 is released from the ratchet wheel 34, whereby a suitable windup force of the spiral spring 18 is applied to the webbing 20, thereby enabling the retractor to maintain a pleasant fitness for the occupant. When the occupant releases the webbing, the remaining portion of the webbing is reliably wound by the take-up shaft through the windup force of the spiral spring 18.

In addition, in emergency of the vehicle and in the case the vehicle runs on a bad road, both pendulums 30, 44 may vibrate together and such a condition may occur that both the wind-out rotation and windup rotation of the take-up shaft 14 are stopped. However, this does not impair the function of the retractor 10, and no problem results therefrom.

In addition, in the above embodiment, there has been described the type in which the pendulum is used as the sensor for sensing the vibration of the vehicle. Needless to say, however, the pendulum may be substituted by any other sensor, such as a ball, which can be actuated in accordance with the vibrations. Furthermore, even though the description has been given of the type in which the pawl is engaged with a ratchet wheel solidly secured to the take-up shaft when the vehicle vibrates, the concept of the present invention is not limited to the type described above. A type in which the take-up shaft is stopped by use of frictional means and the like may be adopted. Any locking device may be usable which can suitably prevent the biasing force of the spiral spring from being applied to the webbing.

As has been described so far, the webbing retractor in the safety seatbelt system according to the present invention senses the vibrations of the vehicle by use of a sensor to actuate the locking device, to thereby prevent the biasing force of the take-up shaft from being applied to the webbing. Hence, there is achieved an excellent effect that, when the vehicle vibrates, the take-up shaft does not windup the webbing unnecessarily, thereby preventing an oppressive sensation from being given to the occupant.

We claim:

1. A webbing retractor in a safety seatbelt system, wherein the webbing is wound up on a take-up shaft through a biasing force, said retractor comprising:
    a first sensor for sensing the vibrations of the vehicle;
    a locking device actuated by said sensor to prevent the biasing force of the take-up shaft from being applied to the webbing, said locking device comprising a first ratchet wheel solidly secured to the take-up shaft and a first pawl actuated by said first sensor to mesh with said first ratchet wheel to thereby prevent wind-up rotations of the first ratchet wheel and the take-up shaft; and
    a means for preventing an unwinding rotation of said take-up shaft during an emergency, said means comprising:
        a second ratchet wheel which is solidly secured to said take-up shaft and whose ratchet teeth are opposite to that of said first ratchet wheel;
        a second pawl to mesh with the second ratchet wheel for stopping the wind-out rotation of the take-up shaft; and
        a second sensor for actuating the second pawl in an emergency of the vehicle.

2. A webbing retractor as set forth in claim 1, wherein said locking device is disposed outwardly of a frame supporting said take-up shaft.

3. A webbing retractor as set forth in claim 2, wherein said first sensor is a pendulum, on top of which said first pawl is mounted so that when said vehicle vibrates said pendulum oscillates and engages said first pawl with said first ratchet wheel.

4. A webbing retractor as set forth in claim 3, wherein said pendulum is supported on a bracket projecting outwardly from said frame.

* * * * *